US008756279B2

(12) United States Patent
Lifshits

(10) Patent No.: US 8,756,279 B2
(45) Date of Patent: Jun. 17, 2014

(54) ANALYZING CONTENT DEMAND USING SOCIAL SIGNALS

(75) Inventor: Yury Lifshits, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 134 days.

(21) Appl. No.: 13/185,496

(22) Filed: Jul. 18, 2011

(65) Prior Publication Data

US 2013/0024507 A1 Jan. 24, 2013

(51) Int. Cl.
*G06F 15/16* (2006.01)

(52) U.S. Cl.
USPC ............................ 709/204; 709/202; 709/217

(58) Field of Classification Search
USPC .................................. 709/217–219, 202–206
See application file for complete search history.

(56) References Cited

U.S. PATENT DOCUMENTS 8,121,893 B1 * 2/2012 Krikheli et al. .............. 705/14.1
8,156,206 B2 * 4/2012 Kiley et al. ................... 709/206
8,463,658 B2 * 6/2013 Racco .......................... 705/26.1
8,572,173 B2 * 10/2013 Briere et al. .................. 709/204
2001/0044800 A1 * 11/2001 Han ............................. 709/219
2008/0243633 A1 * 10/2008 Spiegelman .................... 705/26
2009/0157750 A1 * 6/2009 Kim et al. .................. 707/104.1
2010/0030578 A1 * 2/2010 Siddique et al. .............. 709/206
2011/0087526 A1 * 4/2011 Morgenstern et al. ....... 705/14.1
2012/0041768 A1 * 2/2012 Reese ........................... 705/1.1

OTHER PUBLICATIONS

Nagarajan et al., Spatio-Temporal-Thematic Analysis of Citizen-Sensor Data—Challenges and Experiences, Tenth International Conference on Web Information Systems Engineering (2009).
Mendes et al., Linked Open Social Signals, 2010 IEEE/WIC/ACM International Conference on Web Intelligence and Intelligent Agent Technology (2010).

* cited by examiner

*Primary Examiner* — Bharat N Barot
(74) *Attorney, Agent, or Firm* — Martine Penilla Group, LLP

(57) ABSTRACT

Software at an online contributor website receives a list of websites having online publications. The software gathers counts of user signals for each online publication on each of the websites on the list. And the software determines content descriptors for each of the online publications. The software then counts the online publications at each website associated with each of the content descriptors and counts the user signals at each website associated with each content descriptor. The software displays the content descriptors for each website in a graphic in a graphical user interface, where the size of each content descriptor in the graphic reflects the count of online publications associated with the content descriptor and where the color of each content descriptor in the graphic reflects the count of user signals associated with the content descriptor.

20 Claims, 18 Drawing Sheets

502

601

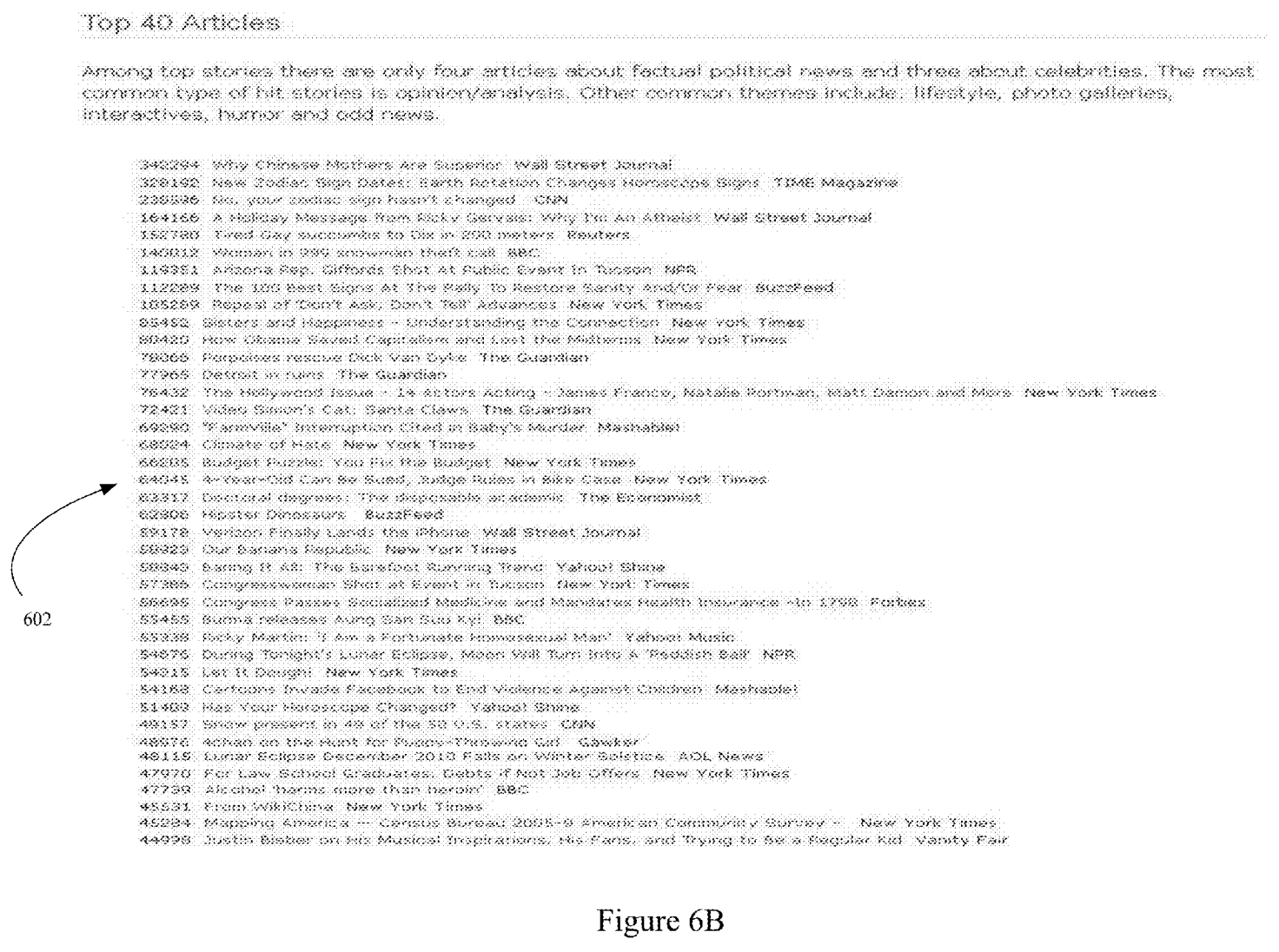

Top 40 Articles

Among top stories there are only four articles about factual political news and three about celebrities. The most common type of hit stories is opinion/analysis. Other common themes include: lifestyle, photo galleries, interactives, humor and odd news.

340294 Why Chinese Mothers Are Superior Wall Street Journal
329192 New Zodiac Sign Dates: Earth Rotation Changes Horoscope Signs TIME Magazine
239536 No, your zodiac sign hasn't changed CNN
164166 A Holiday Message from Ricky Gervais: Why I'm An Atheist Wall Street Journal
152780 Tired Gay succumbs to Dix in 200 meters Reuters
140012 Woman in 999 snowman theft call BBC
119351 Arizona Rep. Giffords Shot At Public Event In Tucson NPR
112289 The 100 Best Signs At The Rally To Restore Sanity And/Or Fear BuzzFeed
105289 Repeal of 'Don't Ask, Don't Tell' Advances New York Times
85452 Sisters and Happiness - Understanding the Connection New York Times
80420 How Obama Saved Capitalism and Lost the Midterms New York Times
78066 Porpoises rescue Dick Van Dyke The Guardian
77965 Detroit in ruins The Guardian
76432 The Hollywood Issue - 14 Actors Acting - James Franco, Natalie Portman, Matt Damon and More New York Times
72421 Video Simon's Cat: Santa Claws The Guardian
69290 'Farmville' Interruption Cited in Baby's Murder Mashable!
68024 Climate of Hate New York Times
66205 Budget Puzzle: You Fix the Budget New York Times
64045 4-Year-Old Can Be Sued, Judge Rules in Bike Case New York Times
63317 Doctoral degrees: The disposable academic The Economist
62808 Hipster Dinosaurs BuzzFeed
59178 Verizon Finally Lands the iPhone Wall Street Journal
58829 Our Banana Republic New York Times
58340 Baring It All: The Barefoot Running Trend Yahoo! Shine
57386 Congresswoman Shot at Event in Tucson New York Times
55695 Congress Passes Socialized Medicine and Mandates Health Insurance -In 1798 Forbes
55455 Burma releases Aung San Suu Kyi BBC
55338 Ricky Martin: 'I Am a Fortunate Homosexual Man' Yahoo! Music
54875 During Tonight's Lunar Eclipse, Moon Will Turn Into A 'Reddish Ball' NPR
54815 Let It Dough! New York Times
54168 Cartoons Invade Facebook to End Violence Against Children Mashable!
51403 Has Your Horoscope Changed? Yahoo! Shine
49157 Snow present in 49 of the 50 U.S. states CNN
48976 4chan on the Hunt for Puppy-Throwing Girl Gawker
48115 Lunar Eclipse December 2010 Falls on Winter Solstice AOL News
47970 For Law School Graduates, Debts if Not Job Offers New York Times
47739 Alcohol 'harms more than heroin' BBC
45531 From WikiChina New York Times
45284 Mapping America -- Census Bureau 2005-9 American Community Survey - New York Times
44998 Justin Bieber on His Musical Inspirations, His Fans, and Trying to Be a Regular Kid Vanity Fair

602

Figure 6B

702

| Signals in average | 1 day | 2 day | 3 day | 4 day | 5 day |
|---|---|---|---|---|---|
| Facebook | 73.94 | 11.57 | 2.83 | 1.29 | 0.48 |
| Twitter | 70.71 | 5.11 | 1.72 | 0.69 | 0.37 |
| Bitly | 73.27 | 8.07 | 2.49 | 1.06 | 1.01 |
| Engadget signals | | | | | |
| Facebook | 56.13 | 24.40 | 9.03 | 4.35 | 1.99 |
| Twitter | 71.27 | 9.24 | 4.12 | 1.28 | 0.71 |
| Bitly | 76.53 | 10.02 | 4.12 | 1.54 | 0.86 |
| Yahoo News signals | | | | | |
| Facebook | 85.49 | 6.69 | 1.01 | 0.38 | 0.10 |
| Twitter | 84.80 | 4.21 | 0.33 | 0.13 | 0.00 |
| Bitly | 33.88 | 2.08 | 0.40 | 0.21 | 0.05 |

Figure 7B

Average activity of Engadget article during the first 68 hours of tracking. Dark represents Facebook, medium represents Twitter, and light represents Bit.ly.

Social activity of Engadget article "BlackBerry users running out of loyalty"

802

| Network | Facebook | Twitter | Bit.ly | FB (non-top) | TW (non-top) | BT (non-top) |
|---|---|---|---|---|---|---|
| Gawker | 24.59 | 4.66 | 13.36 | 11.55 | 4.74 | 2.65 |
| Forbes blogs | 4.61 | 9.16 | 41.41 | 5.13 | 11.86 | 29.00 |
| Business Insider | 3.08 | 6.40 | 34.37 | 3.90 | 28.99 | 106.47 |
| Change.org | 4.43 | 2.74 | 3.54 | 8.69 | 4.12 | 6.25 |

Figure 8B

803

| Network | FB / PV | TW / PV | BT / PV | FB / TW | BT / TW |
|---|---|---|---|---|---|
| Gawker | 0.92 | 0.95 | 0.93 | 0.95 | 0.95 |
| Forbes blogs | 0.35 | 0.40 | 0.63 | 0.34 | 0.63 |
| Business Insider | 0.93 | 0.54 | 0.65 | 0.65 | 0.87 |
| Change.org | -0.01 | 0.45 | 0.05 | 0.34 | 0.65 |
| Excluding top 10 news | | | | | |
| Gawker | 0.47 | 0.63 | 0.41 | 0.47 | 0.35 |
| Forbes blogs | 0.12 | 0.34 | 0.55 | 0.31 | 0.56 |
| Business Insider | 0.34 | 0.43 | 0.53 | 0.50 | 0.80 |
| Change.org | 0.67 | 0.50 | -0.09 | 0.47 | 0.75 |

Figure 8C

Correlation between retweets and pageviews at Gawker network

Correlation between pageviews vs. Facebook (dark), Twitter (medium) and Bit.ly (light) at Change.org.

901

| Feed | Articles tracked | Top item: FB / TW | Top 7: FB / TW | The rest: FB / TW |
|---|---|---|---|---|
| TechCrunch | 182 | 32.3 / 4.6 | 61.5 / 16.8 | 38.5 / 83.2 |
| Mashable | 162 | 23.1 / 2.1 | 47.1 / 13.2 | 52.9 / 86.8 |
| Wired | 120 | 9.9 / 4.8 | 41.4 / 24.9 | 58.6 / 75.1 |
| Engadget | 200 | 44.3 / 18.9 | 68.7 / 27.5 | 31.3 / 72.5 |
| Wall Street Journal | 201 | 36.6 / 5.8 | 65.4 / 18.5 | 34.6 / 81.5 |
| Vanity Fair | 64 | 21.8 / 11.4 | 70.5 / 44.7 | 29.5 / 55.3 |
| Yahoo! Upshot | 109 | 28.8 / 26.0 | 75.7 / 59.1 | 24.3 / 40.9 |
| Yahoo! Top News | 226 | 20.9 / 9.1 | 45.6 / 29.6 | 54.4 / 70.4 |
| All Things D | 139 | 66.2 / 17.2 | 89.2 / 41.5 | 10.8 / 58.5 |
| Gizmodo | 82 | 36.1 / 5.2 | 70.0 / 21.1 | 30.0 / 78.9 |
| Aol News | 78 | 19.2 / 11.4 | 85.1 / 44.4 | 14.9 / 55.6 |

Figure 9

ANALYZING CONTENT DEMAND USING SOCIAL SIGNALS

BACKGROUND

In order to attract audience and effectively compete, editors of websites hosting online publications often apply a content strategy that addresses questions such as the following: What should we write about? How many articles should we publish per day? How should we allocate resources between competing stories? Which stories should we promote? In the context of online publishing, content strategy also typically involves search engine optimization (SEO), e.g., using keywords in online publications that will result in high rankings in search results returned by search engines.

Social media optimization (SMO) is similar to SEO, but, as its name implies, involves optimizing online publications so that they are more easily disseminated through social networking and social media sites such as Facebook, Twitter, bit.ly, etc.

Recently, social networking and social media websites have added social signals (e.g., Facebook likes, Twitter tweets, and bit.ly clicks) that allow users to socially express interest in content or share content with others. These websites have also exposed application programming interfaces (APIs) that allow the tracking of social signals.

At the present time, there is a paucity of tools that use SMO or social signals to facilitate content-strategy decisions.

SUMMARY

In an example embodiment, a processor-executed method is described for evaluating content descriptors for online publications. According to the method, software at an online contributor website receives a list of websites having online publications. The software gathers counts of user signals for each online publication on each of the websites on the list. And the software determines content descriptors for each of the online publications. The software then counts the online publications at each website associated with each content descriptor and counts the user signals at each website associated with each content descriptor. The software displays the content descriptors for each website in a graphic in a graphical user interface (GUI), where the size of each content descriptor in the graphic reflects the count of online publications associated with the content descriptor and where the color of each of the content descriptor in the graphic reflects the count of user signals associated with the content descriptor.

In another example embodiment, an apparatus is described, namely, a computer-readable storage medium that persistently stores a program for evaluating content descriptors for online publications. The program might be part of the software at an online contributor website. The program receives a list of websites having online publications. The program gathers counts of user signals for each online publication on each of the websites on the list. And the program determines content descriptors for each of the online publications. The program then counts the online publications at each website associated with each content descriptor and counts the user signals at each website associated with each content descriptor. The program displays the content descriptors for each website in a graphic in a GUI, where the size of each content descriptor in the graphic reflects the count of online publications associated with the content descriptor and where the color of each content descriptor in the graphic reflects the count of user signals associated with the content descriptor.

Another example embodiment also involves a processor-executed method for recommending topics to editors or contributors to an online contributor network. According to the method, software at an online contributor website receives a list of websites having online publications. The software gathers counts of social signals for each online publication on each of the websites, through one or more application programming interfaces, and determines keywords for each of the online publications. The software then counts the online publications at each website associated with each keyword and counts the social signals at each website associated with each keyword. The software recommends topics to editors or contributors to an online contributor network, based on the counts.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIGS. 6A and 6B show "like" tables ranking websites with online publications and stories at those websites, in accordance with an example embodiment.

FIG. 7A through 7D show tables or graphs illustrating the decline of social signals for online publications over time, in accordance with an example embodiment.

FIG. 8A through 8E show tables or graphs illustrating the association between social signals and pageviews, in accordance with an example embodiment.

FIG. 9 shows a table illustrating the head-tail distribution of social signals for online publications, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
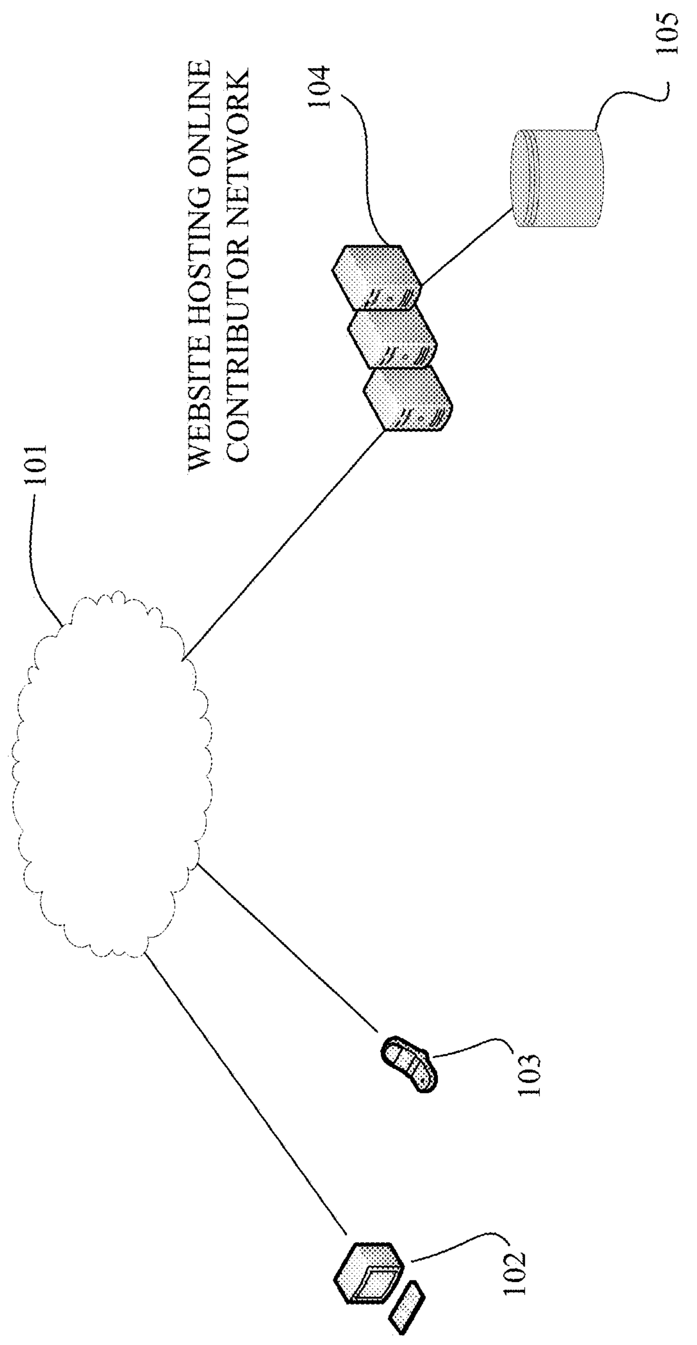
FIG. 1 is a simplified network diagram that illustrates a website hosting an online contributor network, in accordance with an example embodiment.

FIG. 1 is a simplified network diagram that illustrates a website hosting an online contributor network, in accordance with an example embodiment. As depicted in this figure, a personal computer 102 (which might be a laptop or other mobile computer) and a mobile device 103 (e.g., a smartphone such as an iPhone, Blackberry, Android, etc.) are connected by a network 101 (e.g., a wide area network (WAN) including the Internet, which might be wireless in part or in whole) with a website 104 hosting an online contributor network (e.g., Yahoo! Contributor Network) for online publications. In an example embodiment, the website 104 is composed of a number of servers connected by a network (e.g., a local area network (LAN) or a WAN) to each other in a cluster or other distributed system which might execute distributed-computing software such as Map-Reduce, Google File System, Hadoop, Pig, etc. The servers are also connected (e.g., by a storage area network (SAN)) to persistent storage 105. In an example embodiment, persistent storage 105 might include a redundant array of independent disks (RAID). In an example embodiment, persistent storage 105 might be used to store online publications and data related to social or other user signals and content descriptors (e.g., keywords), as described in further detail below.

Personal computer 102 and the servers in website 104 might include (1) hardware consisting of one or more microprocessors (e.g., from the x86 family or the PowerPC family), volatile storage (e.g., RAM), and persistent storage (e.g., a hard disk), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computer 102 and mobile device 103 might each include a browser as an application program or part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and Palm webOS Browser. It will be appreciated that users (e.g., content contributors such as writers, photographers, and/or videographers) of personal computer 102 and mobile device 103 might use browsers to communicate with software running on the servers at website 104. In an example embodiment, one or more of the servers at website 104 might execute the software described in further detail below.

Figure 2:
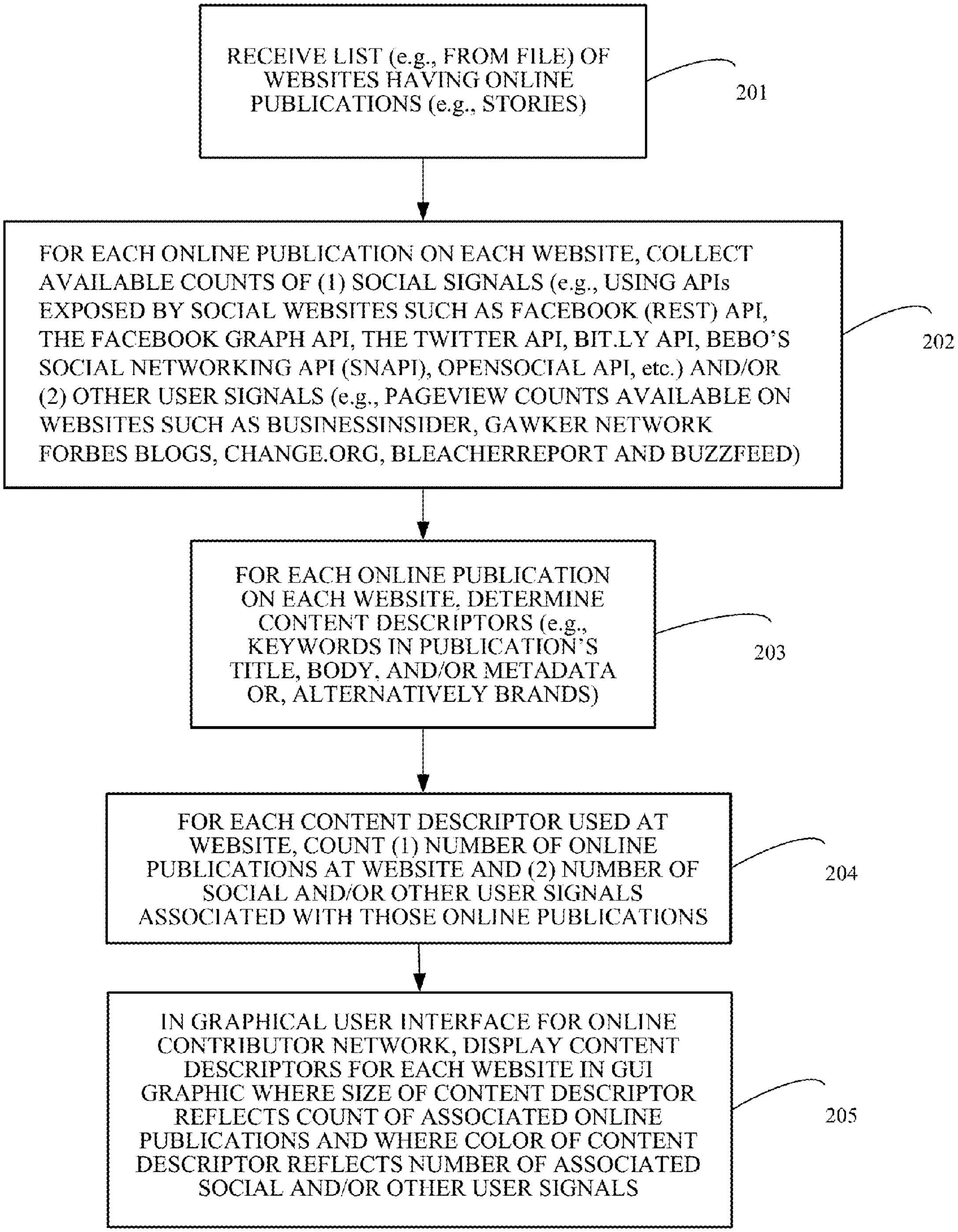
FIG. 2 is a flowchart diagram that illustrates a process for suggesting topics to the editors and/or contributors for an online contributor network, in accordance with an example embodiment.

FIG. 2 is a flowchart diagram that illustrates a process for suggesting topics to the editors and/or contributors for an online contributor network, in accordance with an example embodiment. In an example embodiment, one or more of the operations in this process might be performed by software running on the servers at website 104 in FIG. 1. Other operations might be performed by client software or a browser running on personal computer 102 or mobile device 103 in FIG. 1.

As depicted in FIG. 2, software running on one or more servers at website 104 (e.g., an online contributor network) receives a list (e.g., from a file or a user) of websites having online publications (including e.g., stories or articles consisting of text, images, audio, and/or video), in operation 201. It will be appreciated that such websites might be associated with entities such as the New York Times, the BBC, NPR, The Economist, Yahoo! Sports, Fox News, CNN, TechCrunch, etc. In operation 202, the software collects available counts (or similar quantitative measures) of social and other user signals for each online publication on each website. As used in this disclosure, a "social signal" is a user signal associated with a social (networking, media, etc.) website and includes such things as Facebook likes or comments, Twitter tweets (defined broadly to include retweets), Hacker News upvotes, bookmarking-and-sharing (e.g., using a service such as AddThis), etc. Typically, a user creates a social signal by clicking on an icon (e.g., labeled "Like" for Facebook or "Tweet" for Twittter) displayed on web page (e.g., by entering a command through a GUI widget). In an example embodiment, these social signals might be collected using application programming interfaces (APIs) exposed by the social websites themselves, e.g., the Facebook (REST) API, the Facebook Graph API, the Twitter API, bit.ly API, Bebo's Social Networking API (SNAPI), OpenSocial API, etc.

As used in this disclosure, "other user signals" are user signals such as timed or untimed pageviews (e.g., clicking on a URL and downloading the associated web page) or bookmarking (e.g., locally storing a URL for a web page) that indicate an interest in or engagement with a webpage. In an example embodiment, counts of such other user signals might be collected from websites that make signal counts available, e.g., the pageview counts made available by BusinessInsider, Gawker Network, Forbes blogs, Change.org, BleacherReport, BuzzFeed, etc. Or such user signals might be scraped as a count directly off of a web page (e.g., by parsing HTML or another markup language). In an alternative example embodiment, the software might collect social and other user signals, rather than counts of signals, and include functionality for tallying the signals into counts. It will be appreciated that both social signals and other user signals are a form of positive relevance (or interest and/or engagement) feedback. In the case of social signals, the relevance feedback is express. In the case of other user signals such as pageviews or bookmarks, the relevance feedback is implicit or passive.

In operation 203, the software determines content descriptors (e.g., keywords in a webpage's title, body, and/or metadata or, alternatively, brands) for each online publication on each website. For each content descriptor used at a website, the software counts the number of online publications at the website associated with the content descriptor and the number of social and/or other user signals associated with those online publications, in operation 204. The number of such online publications might be thought of as the supply associated with the content descriptor, to use an economics analogy. Continuing the analogy, the number of such social and other user signals might be thought of as the demand associated with the content descriptor. Then in operation 205, the software causes the content descriptors for each website to be displayed in a graphic (e.g., an interactive word cloud or heat map) in a GUI for the online contributor network. In an example embodiment, the size of a content descriptor in the graphic might reflect the count of online publications at the website associated with the content descriptor (e.g., the larger the number of publications the large the content descriptor) and the color of the content descriptor might reflect the number of social and/or other user signals at the website associated with the content descriptor (e.g., the larger the number of social signals the more the color the content descriptor is toward the red end of the spectrum rather than the violet end of the spectrum).

As noted above, the software determines content descriptors (e.g., keywords in a webpage's title, body, and/or metadata or, alternatively, brands) for each online publication on each website, in operation 203. In an example embodiment where the content descriptors are keywords, the software might determine keywords by (1) eliminating stop words using a statistical measure such as tf-idf (term frequency-inverse document frequency) or (2) all words with a low idf.

Alternatively, a restricted lexicon might be applied to determine content descriptors, e.g., as described in co-owned U.S. Published Patent Application No. 2009/0254512 which discusses Peter Anick's Prisma technology.

In operation 204 of the process shown in FIG. 2, the software counts the number of online publications at the website associated with the content descriptor. It will be appreciated that this number is a measure of the frequency of coverage associated with the content descriptor. An alternative example embodiment might use some other measure of frequency of coverage, such as the total number of instances of the content descriptor in all online publications at the website.

Also as noted above, the software causes the content descriptors for each website to be displayed in a GUI for an online contributor network, in operation 205. The GUI might be similar to the dashboard used by the Yahoo! Contributor Network, which suggests topics to editors and/or contributors. As described above a graphic such as an interactive word cloud or heat map might be used for these topic suggestions Examples of word clouds are describe below. However, in an alternative example embodiment, the content descriptors might simply be displayed as text, e.g., a list of keywords. It will be appreciated that such topic suggestions might be used to facilitate keyword-oriented SEO, in an example embodiment.

Figure 3:
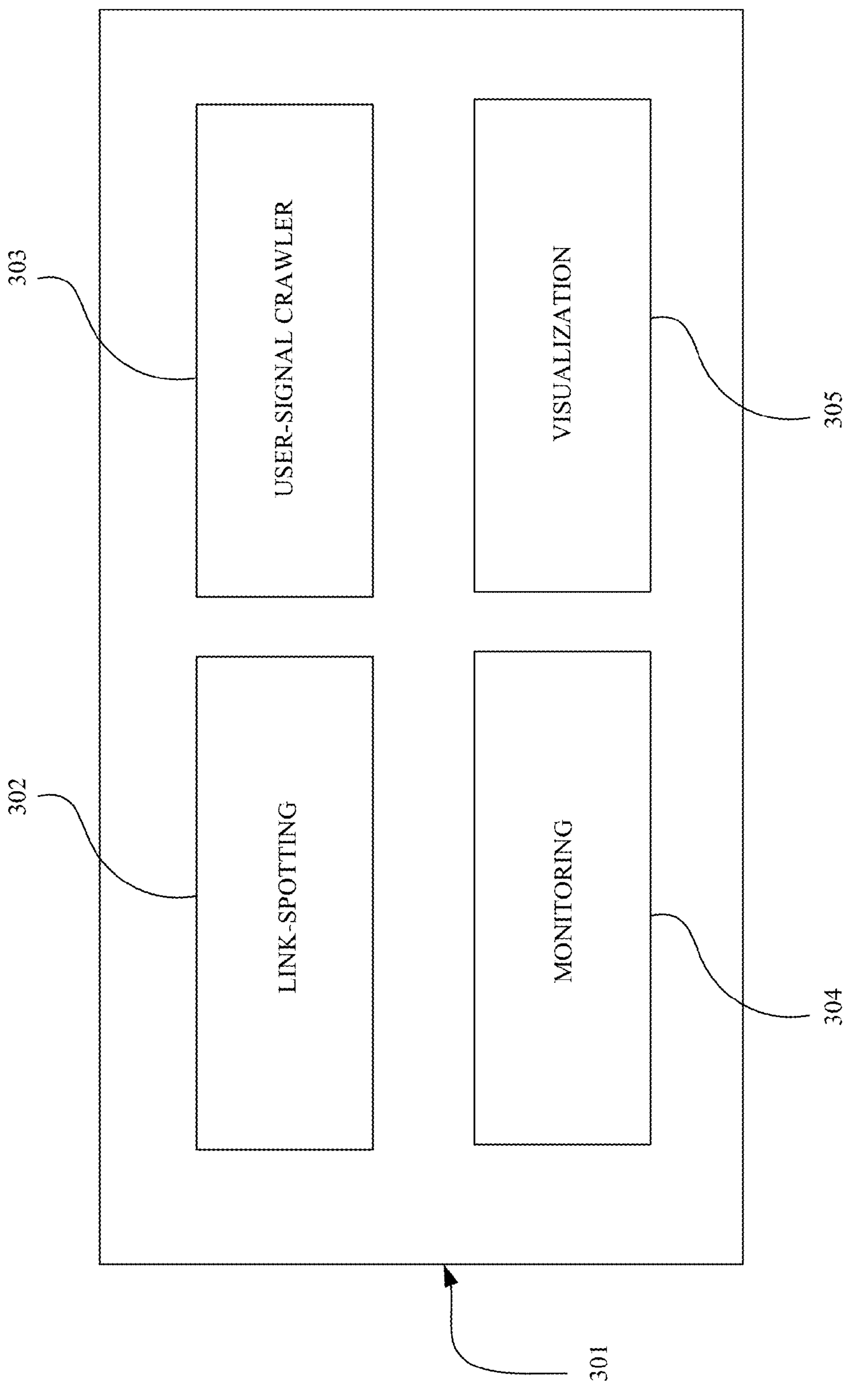
FIG. 3 is a simplified software diagram that illustrates functional modules for suggesting topics to the editors and/or contributors for an online contributor network, in accordance with an example embodiment.

FIG. 3 is a simplified software diagram that illustrates functional modules for suggesting topics to the editors and/or contributors for an online contributor network, in accordance with an example embodiment. In an example embodiment, these modules might be components of software running on the servers at website 104 in FIG. 1. In an alternative example embodiment, one or more of these modules might run on client software or as a browser plug-in on personal computer 102 or mobile device 103 in FIG. 1.

As depicted in FIG. 3, software 301 consists of four modules: (1) a link-spotting module 302; (2) a user-signal crawler 303; (3) a monitoring module 304; and a visualization module 305. In an example embodiment, the link-spotting module 302 might receive as an input the list of URLs (uniform resource locators) for websites (e.g., New York Times, the BBC, NPR, etc.) having online publications, as described above with respect to operation 201 of FIG. 2. The link-spotting module 302 might then go to each of the websites on the list and gather the URLs for the web pages at the website, which would include the URLs for web pages containing online publications. In an alternative example embodiment, the link-spotting module 302 might use web-page metadata to determine which web pages at a website are likely to contain online publications. Or the list of URLs received by the link-spotting module might be for web-feed links (e.g., for Really Simple Syndication or RSS feeds). In such an embodiment, the web-feed links might be input to a feed reader that is a sub-component of the link-spotting module 302, in order to systematically gather new links for web pages that contain online publications. Here it will be appreciated that some web-link feeds (e.g., Feedburner and Pheedo) use proxy links (or URLs) in order to measure the clicks from feed readers. Consequently, the link-spotting module might convert proxy links to original links, in an example embodiment.

In an example embodiment, the URLs for web pages containing online publications go from the link-spotting module 302 to (1) the user-signal crawler 303 and (2) the monitoring module. User-signal crawler 303 might use these URLs to gather social signals by calling the public APIs for entities such as Facebook, Twitter, bit.ly, etc., as described above with respect to operation 202 of FIG. 2. In an example embodiment, user-signal crawler 303 might also use these URLs to gather other user signals (such as pageviews) directly from associated websites or indirectly by scraping the web pages associated with the URLs.

Monitoring module 304 might use the URLs received from the link-spotting module 302 to obtain updated counts for social and other user signals for a web page over time. For example, the monitoring module might re-crawl active URLs (or links) in a database every hour and compute a delta with respect to the previous crawl. Such time studies might be used to generate statistics (e.g., average lifespan) that are valuable for making resource and placement decisions regarding online publications at a website.

In an example embodiment, other components of the software 301 might perform the processing described above with respect to operations 203 and 204 in FIG. 2 (e.g., obtaining keywords from web pages and associating the keywords with social and other user signals). Using the counts output by this processing, the visualization module 305 might create a GUI graphic such as an interactive word cloud or heat map for display in a browser as described above with respect to operation 205 in FIG. 2. Examples of word clouds are described below. In an example embodiment, visualization module 30 might employ calls to Google Chart API when creating this GUI graphic.

Figure 4A:
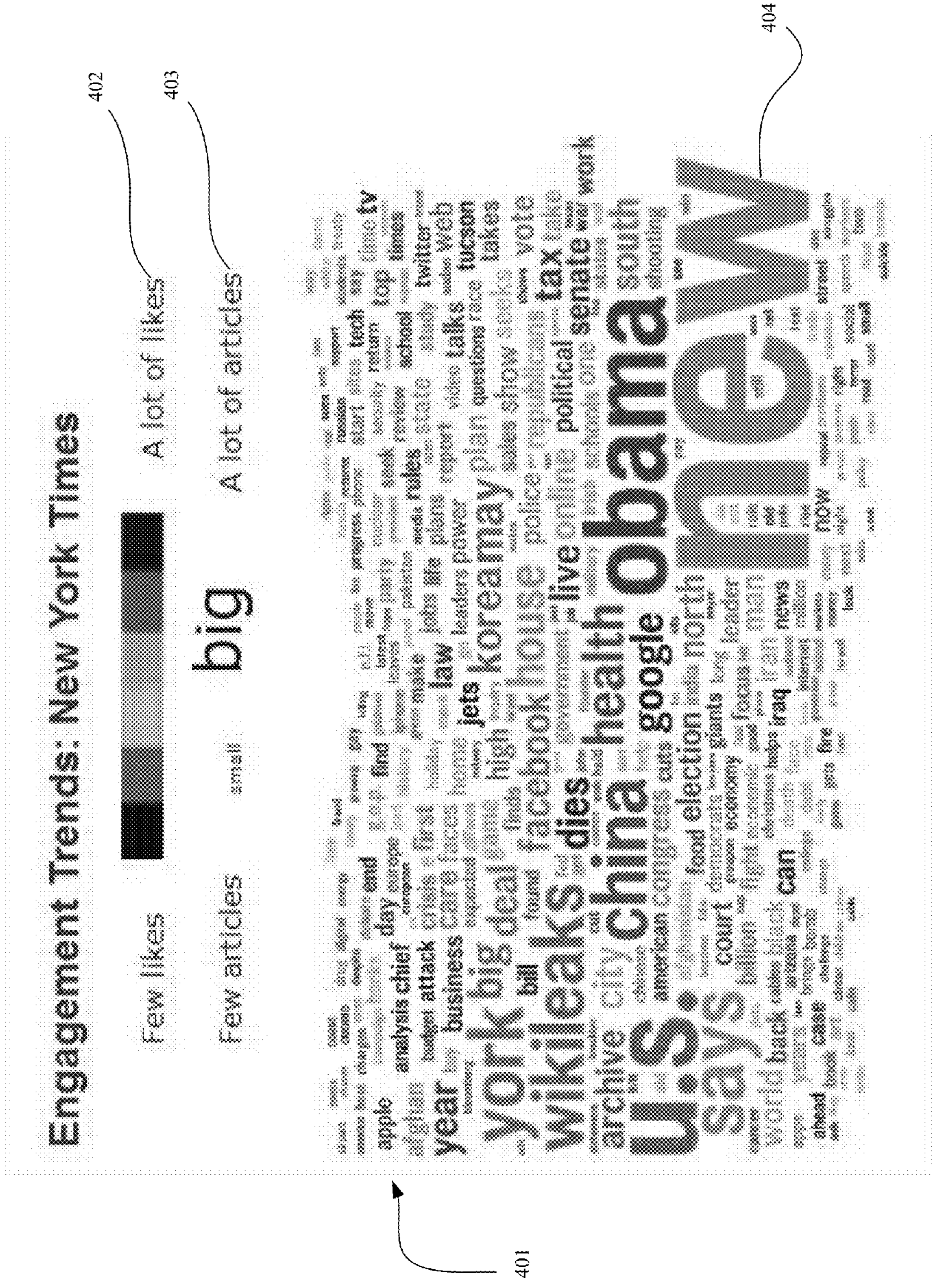
FIGS. 4A and 4B show keyword clouds, in accordance with an example embodiment.
Figure 4B:
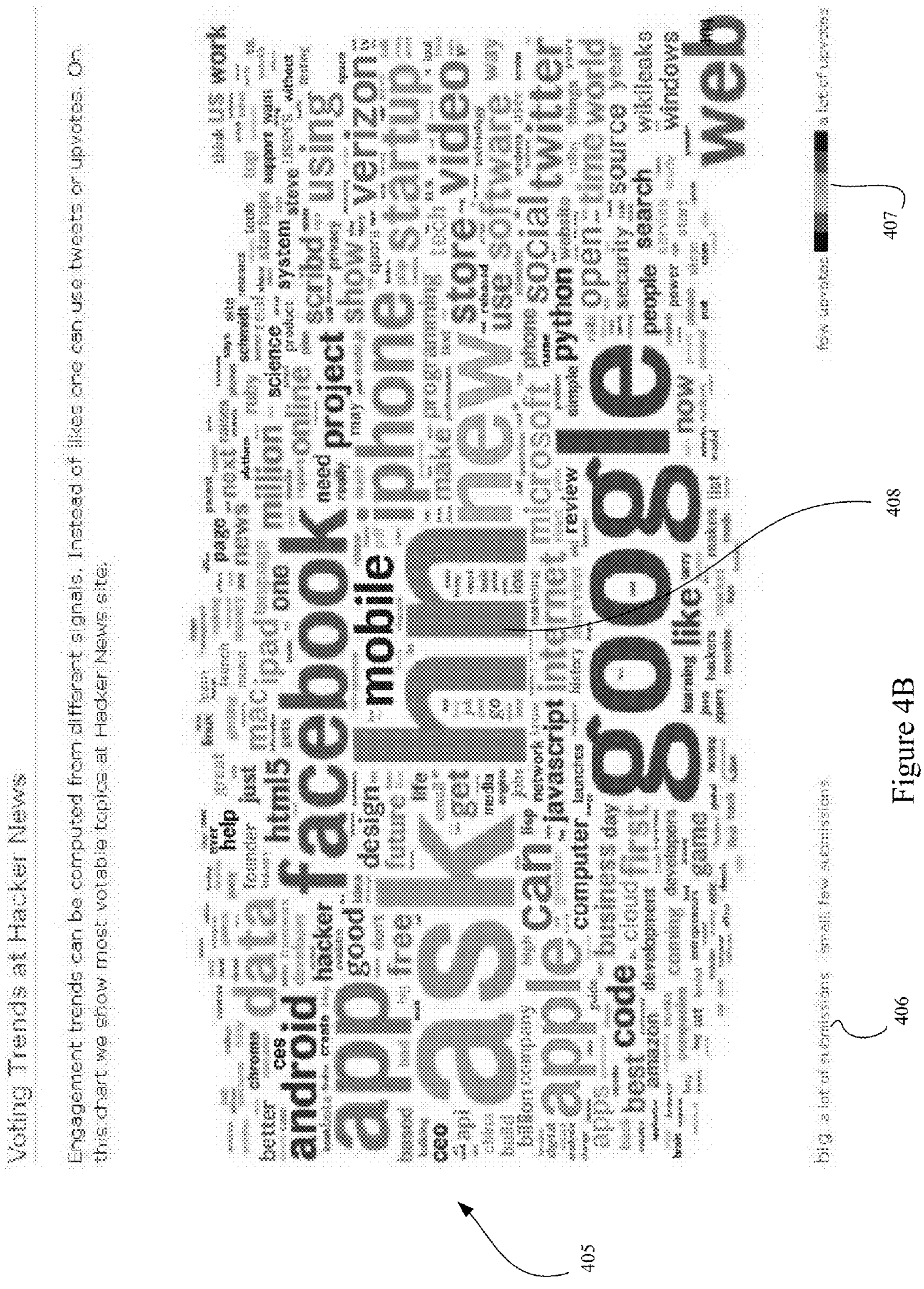

FIGS. 4A and 4B show keyword clouds, in accordance with an example embodiment. As depicted in FIG. 4A, keyword cloud 401 shows keywords for online publications at the New York Times website. It will be appreciated that keyword cloud 401 might be generated by the process depicted in the flowchart in FIG. 2. The spectrum 402 in FIG. 4 relates colors with the number of likes a keyword has on Facebook. If a keyword is associated with "Few likes", it is at the violet end of the spectrum 402. If a keyword is associated with "A lot of likes", it is at the red end of the spectrum 402. The scale 403 associates word size with the number of articles at the website that include the keyword. If only a "Few articles" include the keyword, the size of the keyword in the word cloud is "small". If "A lot of articles" include the keyword, the size of the keyword in the word cloud is "big". In word cloud 401, the keyword associated with the most articles is keyword 404, "new". However, keyword 404 has less Facebook likes than other keywords such as "obama".

As depicted in FIG. 4B, keyword cloud 405 shows keywords for online submissions at the Hacker News website. It will be appreciated that keyword cloud 405 might be generated by the process depicted in the flowchart in FIG. 2. The spectrum 407 in FIG. 4B associates colors with the number of upvotes a keyword has on Hacker News. If a keyword is associated with "few upvotes", it is at the violet end of the spectrum 407. If a keyword is associated with "a lot of upvotes", it is at the red end of the spectrum 407. The scale 406 relates word size with the number of submissions at the website that include the keyword. If only a "few submissions" include the keyword, the size of the keyword in the word cloud is "small". If "a lot of submissions" include the keyword, the size of the keyword in the word cloud is "big". In word cloud 405, the keyword associated with the most submissions is keyword 408, "hn". However, keyword 408 has fewer upvotes than other keywords such as "google".

Figure 5A:
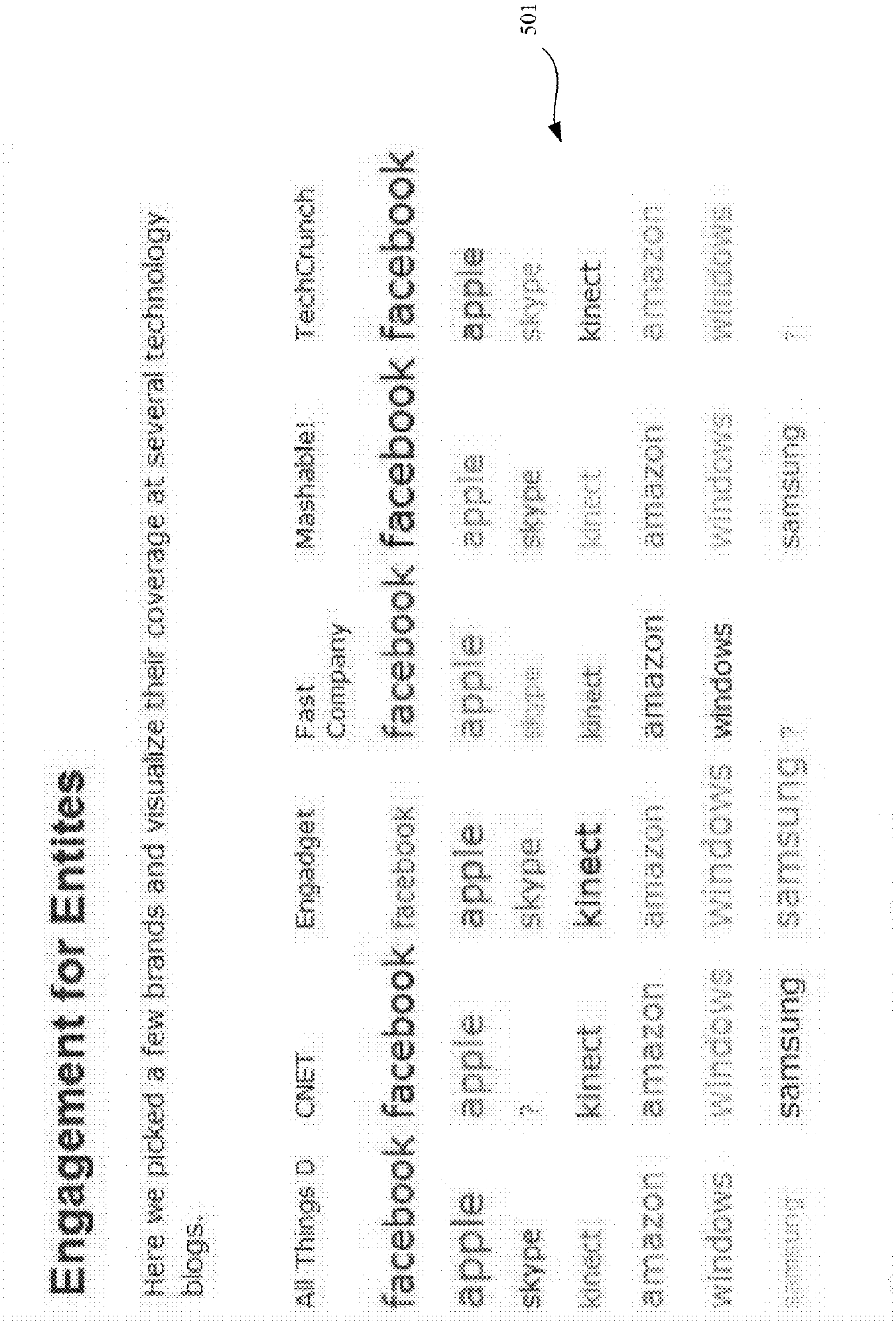
FIGS. 5A and 5B show "like" tables for various websites associated with technology blogs, in accordance with an example embodiment.
Figure 5B:
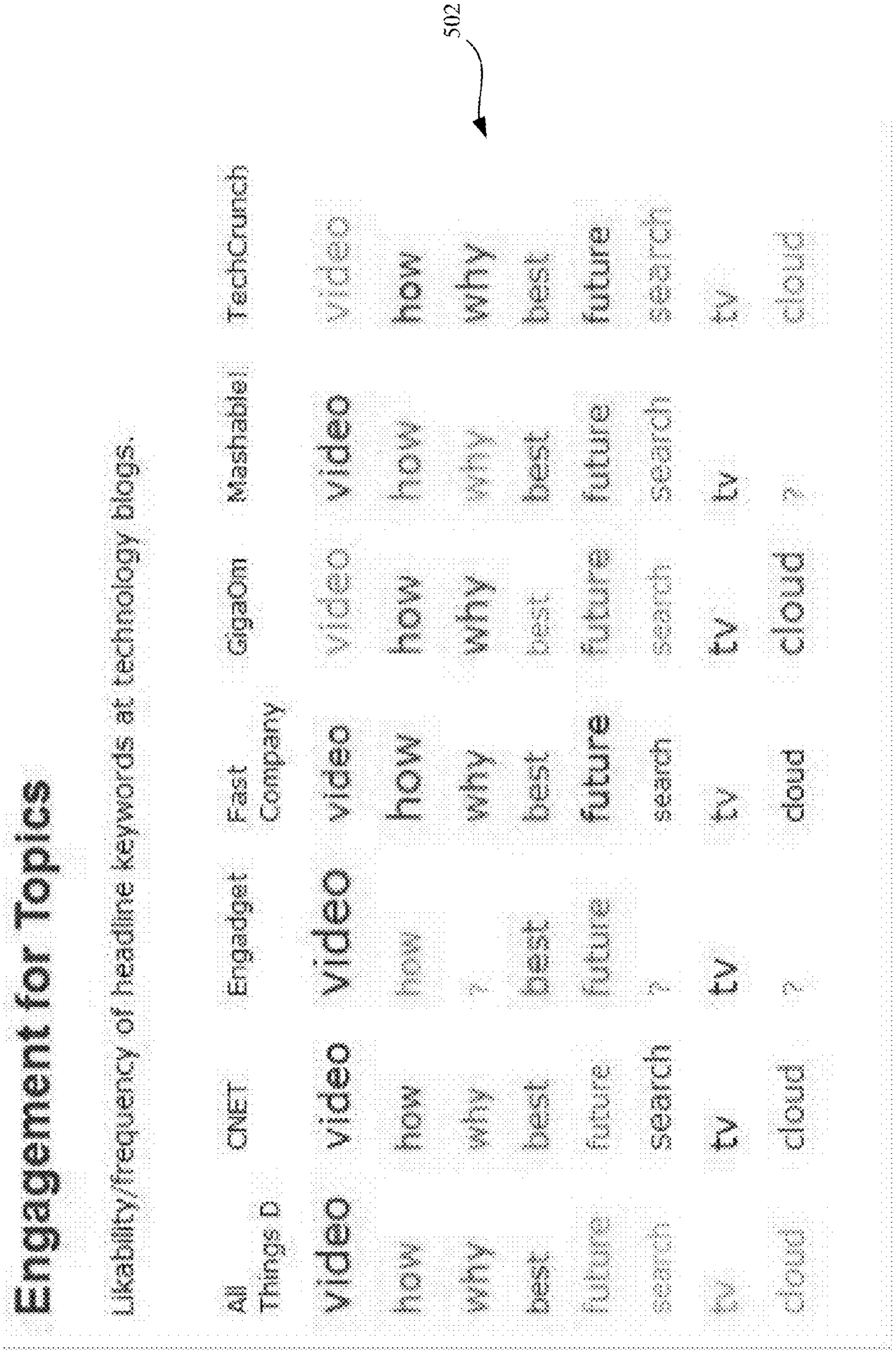

FIGS. 5A and 5B show "like" tables for various websites associated with technology blogs, in accordance with an example embodiment. It will be appreciated that these "like" tables might be generated by the process depicted in the flowchart in FIG. 2. In an example embodiment, these "like" tables might use the spectrum (red indicates a lot of Facebook likes, violet indicates few Facebook likes) and the scale (big indicates a lot of online publications, small indicates few online publications) described above. In table 501 in FIG. 5A, the content descriptors are brands, not keywords. At most of the websites shown in this table (e.g., TechCrunch), "facebook" is the brand with both the most likes and the most publications. In table 502 in FIG. 5B, the content descriptors are headline descriptors. At many of the websites shown in this table (e.g., Engadget), "video" is the headline keyword with both the most likes and the most publications.

Figure 6A:
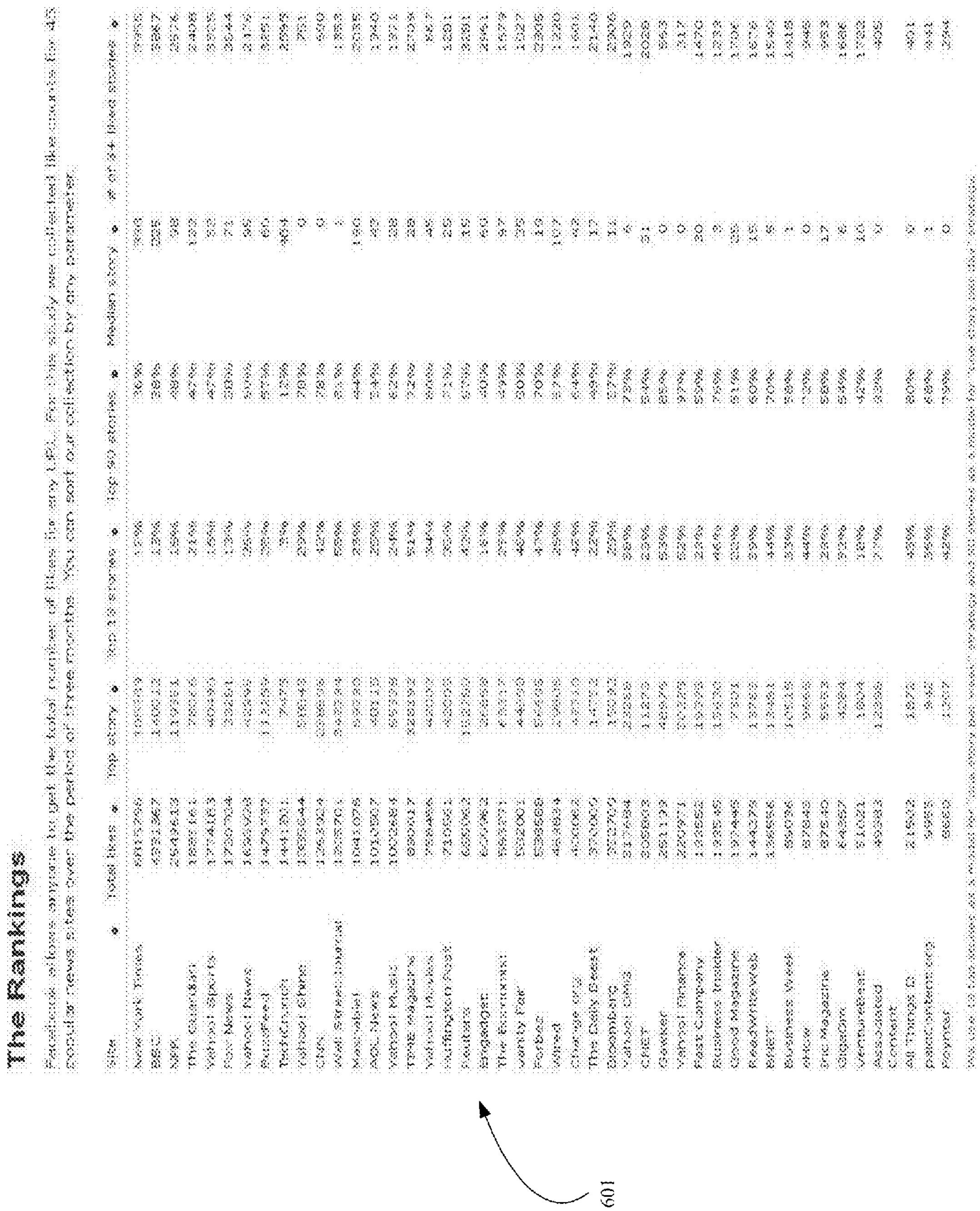

FIGS. 6A and 6B show "like" tables ranking websites with online publications and stories at those websites, in accordance with an example embodiment. These tables are based on the "like" counts for 45 websites collected over the period of three months, using the Facebook API. See the Like Log Study by Yury Lifshits (Yahoo! Labs, 2011), which was published and which is incorporated herein by reference. It will be appreciated that these tables and graphs might be generated using some of operations in the process depicted in FIG. 2 and modules depicted in FIG. 3, e.g., the link-spotting module, the user-signal crawling module, and the monitoring module. In table 601 in FIG. 6A, the table columns show: (1) the number of "Total likes" for each website; (2) the number of likes for the "Top Story" for each website; (3) percentage of likes for "Top 13 stories"; (4) the percentage of likes for "Top 90 stories"; (4) the number of likes for a "Median story"; and (5) the number of stories that had three or more likes ("# of 3+ liked stories"). As shown in this table, the New York Times had the most likes, namely, 6,815,796, with the top 90 stories receiving 36% of the likes. Table 602 in FIG. 6B shows the top 40 articles based on the "like" counts for 45 websites. As shown in the table, the top article was from the Wall Street Journal website and was entitled "Why Chinese Mothers Are Superior". It received 342,294 likes.

Figure 7A:
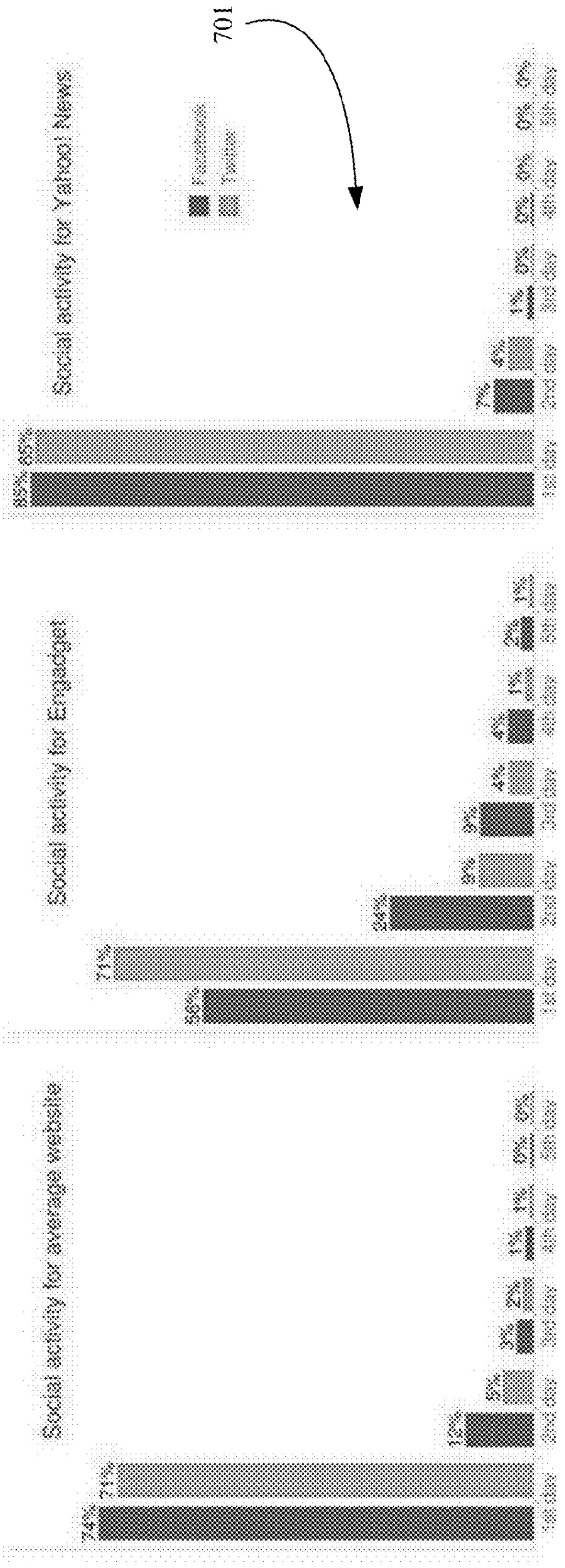

FIG. 7A through 7D show tables or graphs illustrating the decline of social signals for online publications over time, in accordance with an example embodiment. Many of these tables and graphs are from Yury Lifshits, *Ediscope: Social Analytics for Online News* (Yahoo! Labs, Tech. Report No. YL-2010-008), which is incorporated herein by reference and which was published with the Life Log Study. It will be appreciated that these tables and graphs might be generated using some of operations in the process depicted in FIG. 2 and modules depicted in FIG. 3, e.g., the link-spotting module, the user-signal crawling module, and the monitoring module. As depicted in graph 701 in FIG. 7A, 85% of the Facebook actions (e.g., likes/shares/comments) and 85% of the Twitter tweets occur on the first day that an article is published on the website, Yahoo! News. On the third day after the article was published, only 1% of the Facebook actions and 0% of the Twitter tweets occurred. Table 702 in FIG. 7B shows similar data in tabular form. It will be appreciated that the bottom three rows of table 702 show the social signals for Yahoo! News. Again, 85% of the Facebook actions and 85% of the Twitter tweets occur on the first day that an article is published by Yahoo! News. And only 1% of the Facebook actions and 0% of the Twitter tweets occurred on the third day after the article was published.

Figure 7C:
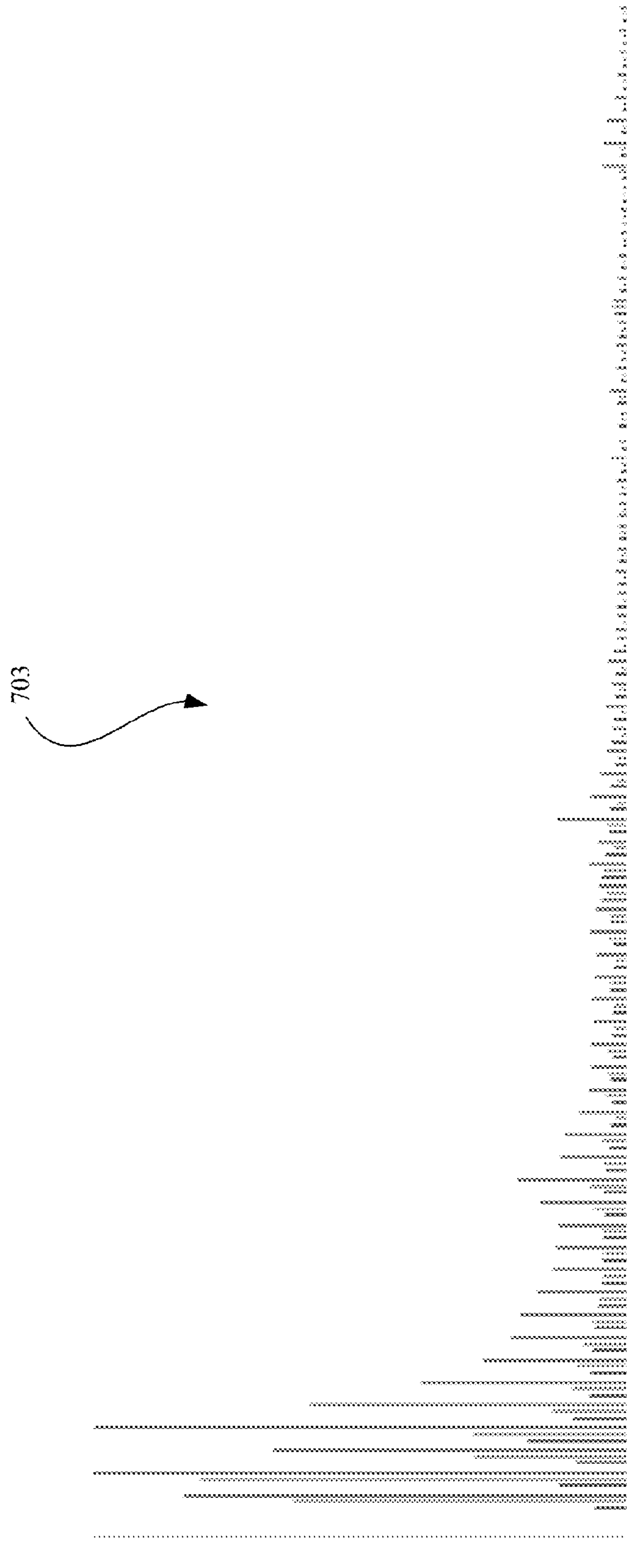
Figure 7D:
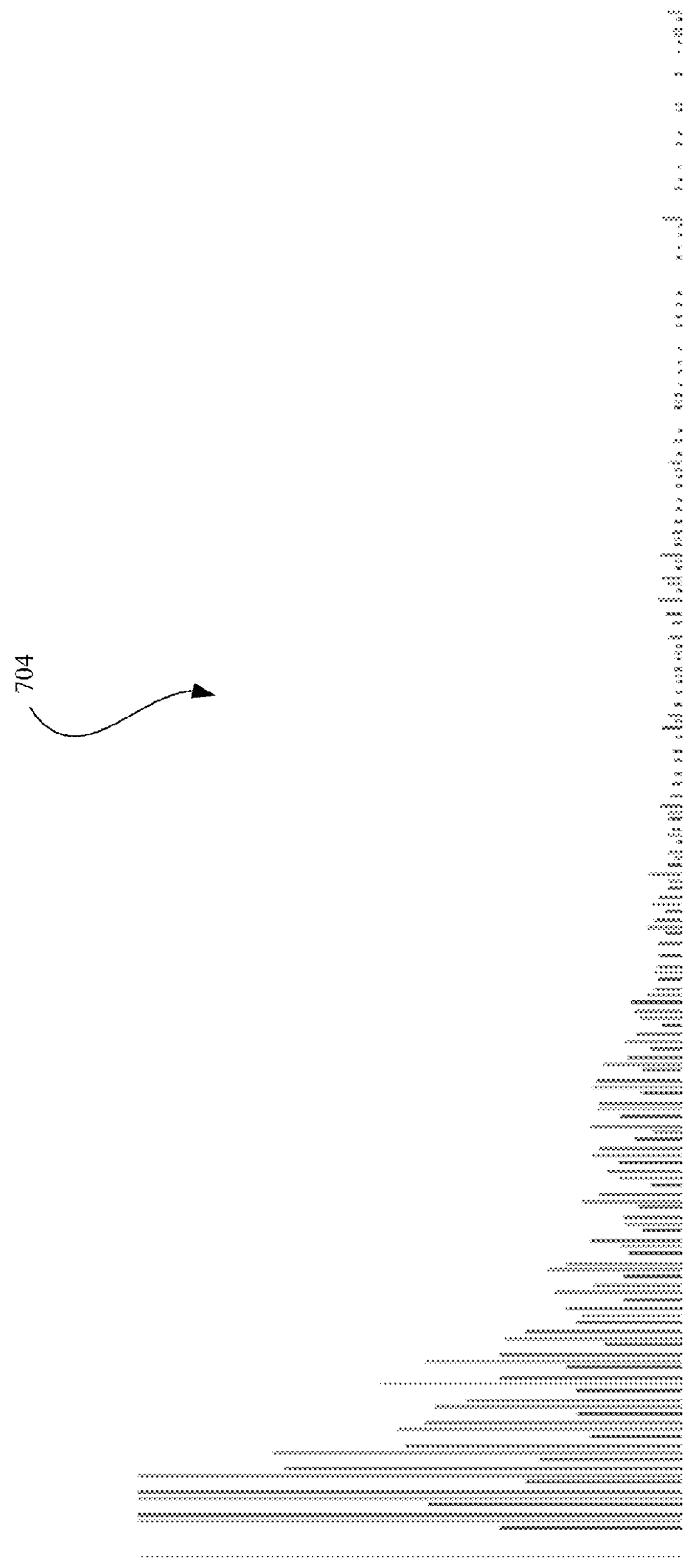

Normalized graph 703 in FIG. 7C shows the average social activity for an article published on the Engadget website, in the first 68 hours after the article is published. As depicted in graph 703, the dark-colored rectangles represent Facebook actions, the medium-colored rectangles represent Twitter tweets, and the light-colored rectangles represent bit.ly clicks (e.g., clicks on bit.ly shortened URLs contained in, for example, Twitter tweets which are limited to a predefined number of characters). It will be appreciated that the leftmost rectangles represent social signals at the time of publication and the rightmost rectangles represent social signals after 68 hours have passed. As shown in graph 703, average social signals for an Engadget article show a non-linear decline during the 68 hours following publication. Graph 704 in FIG. 7D shows this decline for a specific Engadget article entitled "Blackberry users running out of loyalty".

Generally speaking, it will be appreciated that the majority (typically, over 80%) of social activity occurs during the first 24 hours after a website publishes an online publication. It will also be appreciated that this fact has implications for the content strategies employed by editors and product managers working with online publications. In particular, it appears that currently-used tactics for content promotion (e.g., web feeds, front page placements, cross-linking, etc.) mostly drive the first-day viewership/audience. In such an environment, weekly/analytic/evergreen content is not sustainable. Thus, if the editors/product managers of a website want to produce online publications with a longer lifespan, they should depart from existing content-promotion tactics by, e.g., altering front page placements to include publications that are a day or two old.

FIG. 8A through 8E show tables or graphs illustrating the association between social signals and pageviews, in accordance with an example embodiment. Many of these tables and graphs are also from *Ediscope: Social Analytics for Online News*. It will be appreciated that these tables and graphs might be generated using some of operations in the process depicted in FIG. 2 and modules depicted in FIG. 3, e.g., the link-spotting module and the user-signal crawling module. This table is based on publication links (or URLs) which were collected from RSS feeds at several websites that show pageview counts for publications.

Figure 8A:
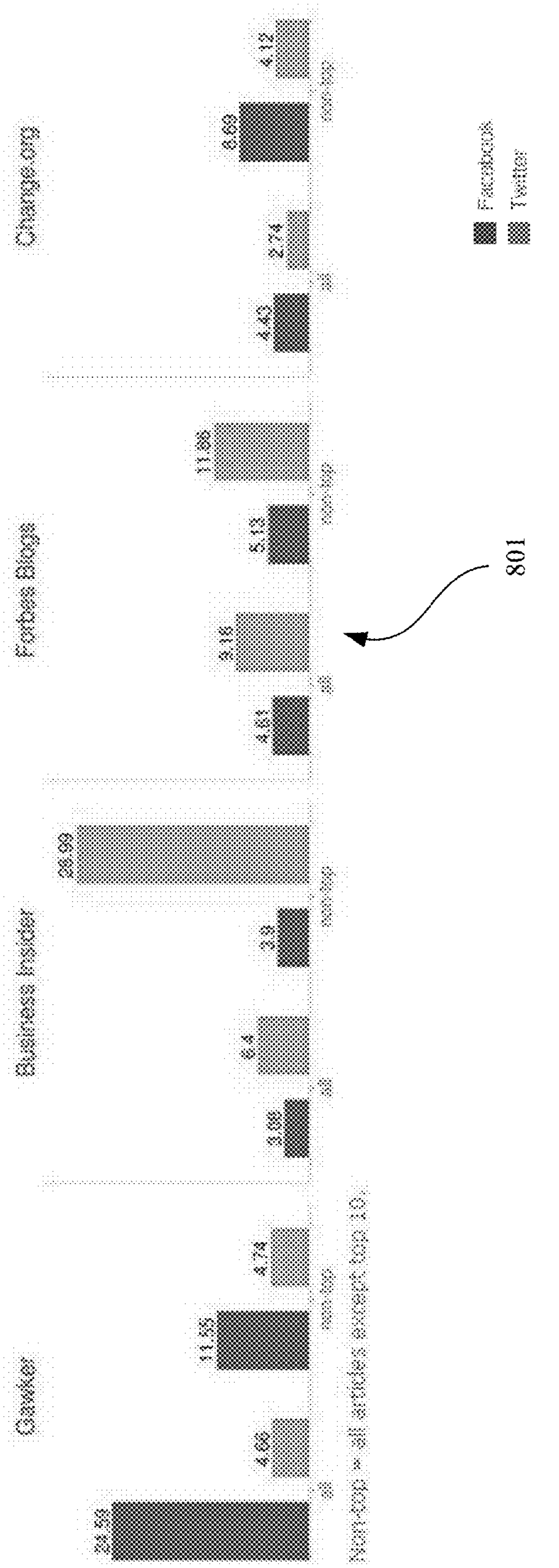

The graphs in FIG. 8A show the number of Facebook actions and Twitter tweets per 1000 pageviews. As depicted in graph 801 in FIG. 8A, the website Forbes Blogs averages approximately 4.61 Facebook actions per 1000 pageviews for all of its articles and approximately 5.13 Facebook actions per 1000 pageviews for non-top articles (e.g., all articles except the top 10 articles). Similarly, the website "Forbes blogs" averages approximately 9.16 Twitter tweets per 1000 pageviews for all of its articles and approximately 11.86 Twitter tweets per 1000 pageviews for non-top articles. Table 802 in FIG. 8B shows similar data in tabular form. In particular, the second rows of table 802 in FIG. 8B show the social signals (Facebook actions, Twitter tweets, and bit.ly clicks) for all and non-top articles at the website "Forbes blogs". Generally speaking, it appears that the articles at the websites included in table 802 receive approximately 10 Facebook actions or Twitter tweets per 1000 pageviews, on average. Also, with the exception of Facebook actions at Gawker, the top articles have fewer social signals per pageview than the non-top articles.

It will be appreciated that the average number of social signals per pageview might be used to detect problems with social-signal widgets on web pages. For example, if the average number of Facebook likes per pageview is 7 per 1000 for stories associated with a particular content descriptor, but a web page associated with one of those stories is only receiving 2 Facebook likes per 1000 pageviews, the markup language/code related to the like widget on that web page might be examined to see whether the markup language/code contains a bug.

Table 803 in FIG. 8C shows the Pearson correlation coefficient (which can range from −1 to 1) between social signals (Facebook actions, Twitter tweets, and bit.ly clicks) and pageviews and between other social signals. As shown in table 803, the website "Forbes blogs" has the following Pearson correlation coefficients for all articles: (1) 0.35 between Facebook actions and pageviews (FB/PV); (2) 0.4 between Twitter tweets and pageviews (TW/PV); (3) 0.63 between bit.ly clicks and pageviews (BT/PV); (4) 0.34 between Facebook actions and Twitter tweets (FB/TW); and (5) 0.63 between bit.ly clicks and Twitter tweets (BT/TW). Similarly, the website "Forbes blogs" has the following Pearson correlation coefficients for non-top articles (excluding the top 10 articles): (1) 0.12 between Facebook actions and pageviews (FB/PV); (2) 0.34 between Twitter tweets and pageviews (TW/PV); (3) 0.55 between bit.ly clicks and pageviews (BT/PV); (4) 0.31 between Facebook actions and Twitter tweets (FB/TW); and (5) 0.56 between bit.ly clicks and Twitter tweets (BT/TW).

Figure 8D:
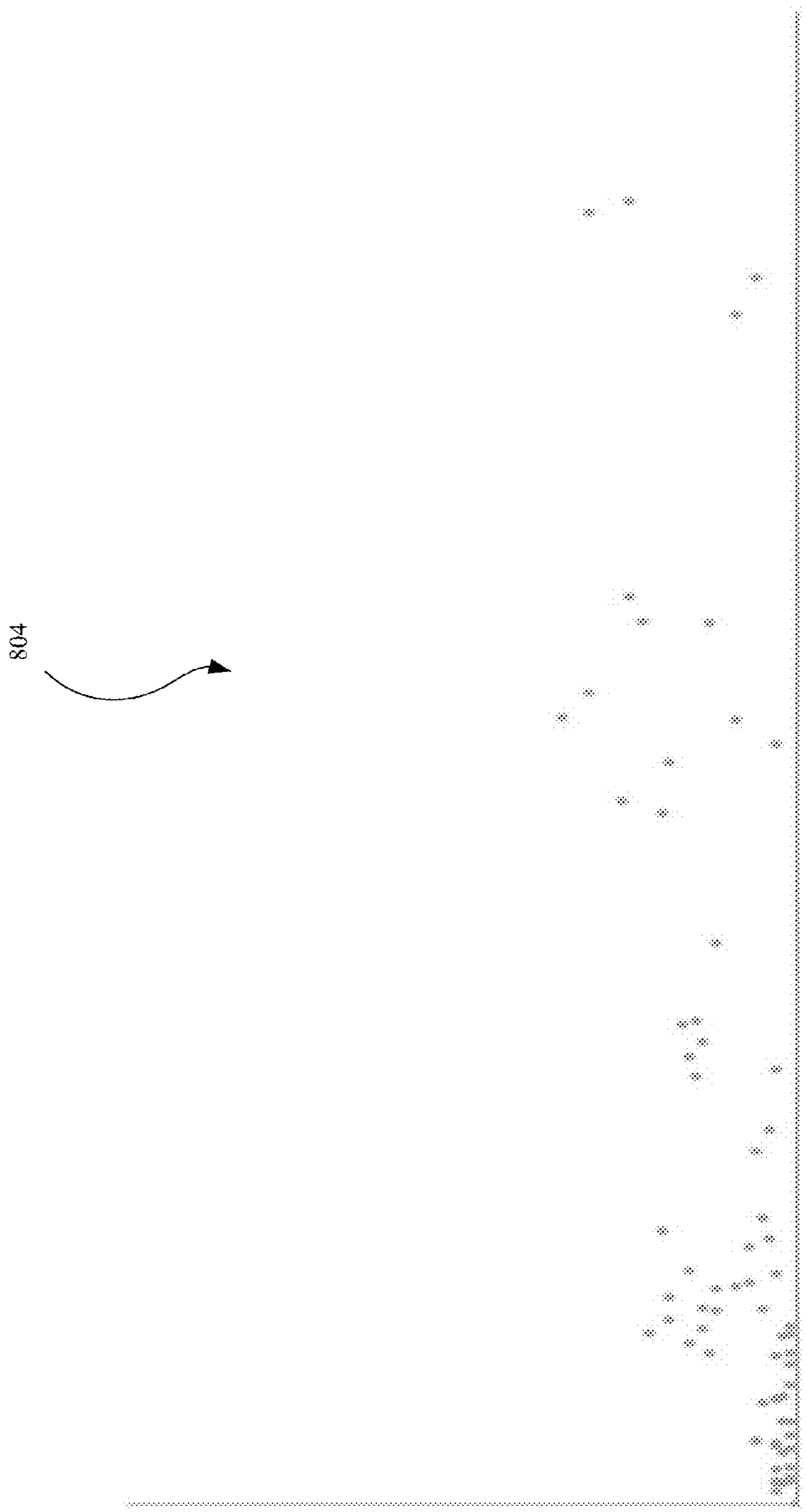
Figure 8E:
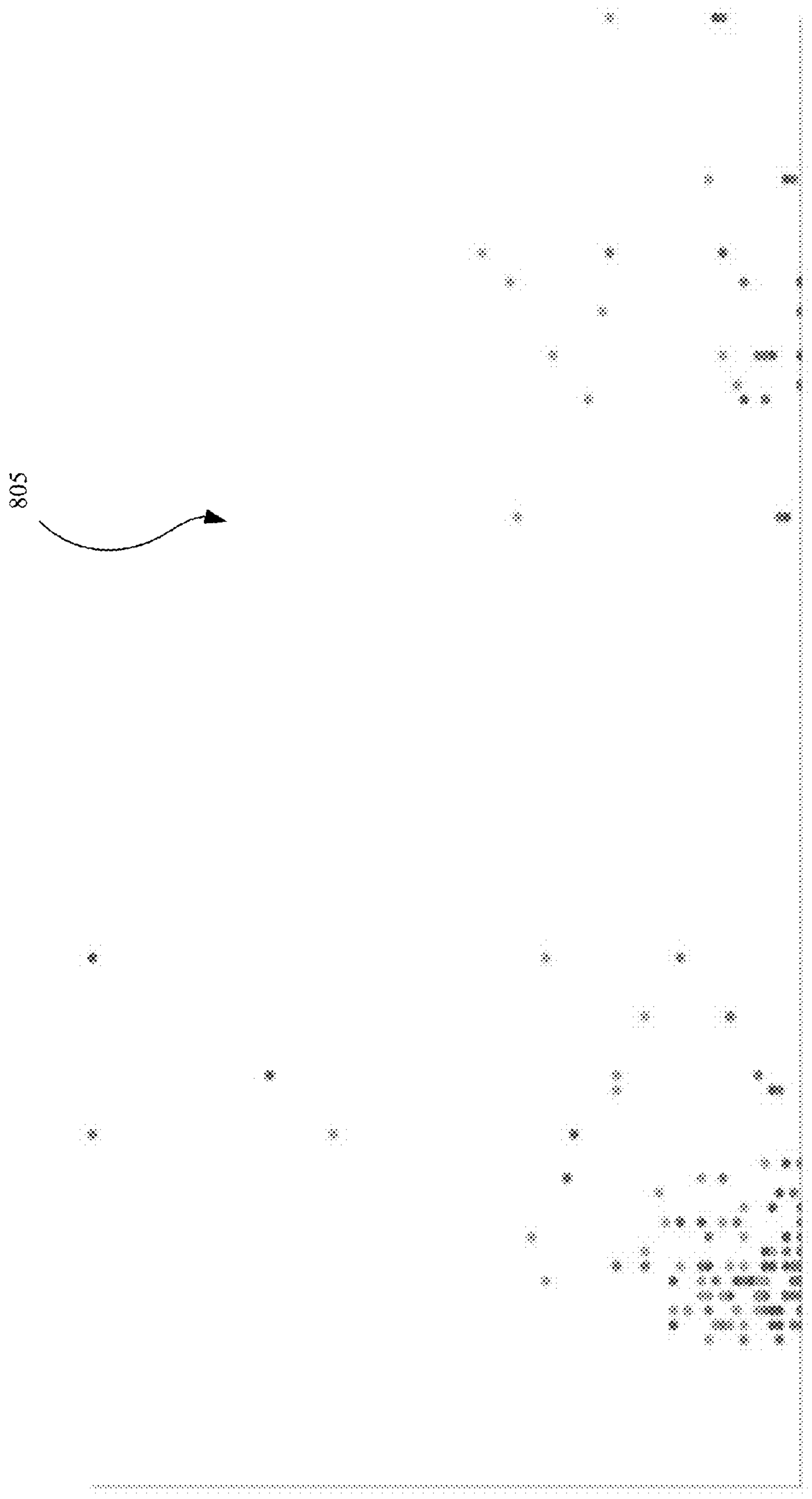

FIG. 8D shows a normalized graph 804 that depicts TW/PV for articles at the Gawker website. It will be appreciated that graph 804 corresponds to the entry in the first row and second column in table 803 in FIG. 8C. FIG. 8E shows a normalized graph 805 that depicts FB/PV (dark-colored points), TW/PV (medium-colored points), and BT/PV (light-colored points) for articles at the Change.org website. The gap in pageviews in the middle of normalized graph 805 represents results from a difference in popularity between different sections of the website.

Generally speaking, it appears that the correlation between social signals and pageviews is approximately 0.5 for non-top articles. Recall that the Pearson correlation coefficient ranges from −1 (perfectly negatively correlated) to 0 (totally independent) to 1 (perfectly positively correlated). Thus, a value of 0.5 means that social signals are as close to perfect correlation with pageviews as they are to total independence from pageviews. Also, it appears that in 6 cases out of 8, Twitter tweets have a higher correlation to pageviews than do Facebook actions. And bit.ly clicks appear to be better correlated with Twitter tweets than with Facebook actions.

FIG. 9 shows a table illustrating the head-tail distribution of social signals for online publications, in accordance with an example embodiment. This table is also from *Ediscope: Social Analytics for Online News*. It will be appreciated that this table might be generated using some of operations in the process depicted in FIG. 2 and modules depicted in FIG. 3, e.g., the link-spotting module and the user-signal crawling module. This table is based on publication links (or URLs) which were collected from RSS feeds at several news websites over the course of one week. Typically, each of these RSS feeds generates approximately 60 to 230 articles per week. Then, social-signal counts were retrieved for each of the discovered articles, e.g., using public APIs. Table 901 in FIG. 9 shows the percentage of weekly social activity that corresponds to the top story, top seven stories, and all stories outside of the top seven stories. It will be appreciated that the number seven was chosen to reflect a publishing practice of one-story-per-day. It will also be appreciated that weekly social activity includes both Facebook actions such as likes/shares/comments (FB) and Twitter tweets (TW).

As shown in the first row in table 901, the feed for the TechCrunch website generated 182 articles. The top article received 32% of the Facebook actions and 4.6% of the Twitter tweets. The top seven articles received 61.5% of the Facebook actions and 16.8% of the Twitter tweets. The rest of the articles received 38.5% of the Facebook actions and 83.2% of the Twitter tweets.

Generally speaking, it appears that approximately 65% of Facebook actions and 25% of Twitter tweets are received by the top seven stories. That is to say, Facebook activity appears much more heavy-headed (as opposed to heavy-tailed) in terms of distribution than Twitter activity. Also, the website Yahoo! Upshot is the most heavy-headed blog in table 901. Approximately 40% of the Twitter tweets and approximately 25% of the Facebook actions are received by articles outside of the top seven articles, suggesting that the readership is not dedicated but rather reacts to story promotion. The website AllThingsD is also fairly heavy-headed, whereas the website Mashable and the website Wired appear to be heavy-tailed. At both the Mashable website and the Wired website, over 50% of Facebook actions and over 75% of the Twitter tweets are received by stories outside of the top 7 stories.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, some or all of the operations described above might be used in conjunction with (1) content websites other than websites with online publications or (2) retail websites. Further, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method for evaluating content descriptors for online publications, comprising the operations of:

receiving a list of websites having online publications;

gathering counts of user signals for each online publication on each website;

determining content descriptors for each online publication;

counting the online publications at each website associated with each content descriptor; and counting the user signals at each website associated with each content descriptor, wherein each operation of the method is executed by one or more processors.

2. The method of claim 1, further comprising the operation of displaying the content descriptors for each website in a graphic in a graphical user interface, wherein the size of each content descriptor in the graphic reflects the count of online publications associated with the content descriptor and wherein the color of each content descriptor in the graphic reflects the count of user signals associated with the content descriptor.

3. The method of claim 1, wherein the counts associated with content descriptors are used to recommend topics in a graphical user interface displayed to editors or contributors by a website for an online contributor network.

4. The method of claim 1, wherein the content descriptors are keywords.

5. The method of claim 1, wherein the user signals are social signals.

6. The method of claim 1, wherein the user signals are selected from the group consisting of likes, shares, comments, tweets, favorites, and upvotes.

7. The method of claim 1, wherein the user signals are pageviews.

8. The method of claim 1, wherein the gathering of counts of user signals involves accessing an application programming interface.

9. The method of claim 8, wherein the application programming interface is provided by a social networking website.

10. A computer-readable storage medium persistently storing a program, wherein the program, when executed, instructs one or more processors to perform the following operations:

receive a list of websites having online publications;

gather counts of user signals for each online publication on each website;

determine content descriptors for each online publication;

count the online publications at each website associated with each content descriptor; and count the user signals at each website associated with each content descriptor.

11. The computer-readable storage medium of claim 10, further comprising the operation of displaying the content descriptors for each website in a graphic in a graphical user interface, wherein the size of each content descriptor in the graphic reflects the count of online publications associated with the content descriptor and wherein the color of each content descriptor in the graphic reflects the count of user signals associated with the content descriptor.

12. The computer-readable storage medium of claim 10, wherein the counts associated with content descriptors are used to recommend topics in a graphical user interface displayed to editors or contributors by a website for an online contributor network.

13. The computer-readable storage medium of claim 10, wherein the content descriptors are keywords.

14. The computer-readable storage medium of claim 10, wherein the user signals are social signals.

15. The computer-readable storage medium of claim 10, wherein the user signals are selected from the group consisting of likes, shares, comments, tweets, favorites, and upvotes.

16. The computer-readable storage medium of claim 10, wherein the user signals are pageviews.

17. The computer-readable storage medium of claim 10, wherein the gathering of counts of user signals involves accessing an application programming interface.

18. The computer-readable storage medium of claim 17, wherein the application programming interface is provided by a social networking website.

19. A method for recommending topics to editors or contributors to an online contributor network, comprising the operations of:

receiving a list of websites having online publications;

gathering counts of social signals for each online publication on each website, through one or more application programming interfaces;

determining keywords for each online publication;

counting the online publications at each website associated with each keyword;

counting the social signals at each website associated with each keyword; and recommending topics to editors or contributors to an online contributor network based at least in part on the counts, wherein each operation of the method is executed by one or more processors.

20. The method of claim 19, wherein the recommending includes displaying the keyword for each website in a graphic in a graphical user interface and wherein the size of ach keyword in the graphic reflects the count of online publications associated with the keyword and wherein the color of each keyword in the graphic reflects the count of social signals associated with the keyword.

* * * * *